United States Patent
Booher

(10) Patent No.: US 10,286,966 B2
(45) Date of Patent: May 14, 2019

(54) PLATFORM TRAILER WITH EXTRUDED FLOOR PANEL CROSS MEMBERS

(71) Applicant: East Manufacturing Corporation, Randolph, OH (US)

(72) Inventor: Howard D. Booher, Atwater, OH (US)

(73) Assignee: East Manufacturing Corporation, Randolph, OH (US)

( * ) Notice: Subject to any disclaimer, the term of this patent is extended or adjusted under 35 U.S.C. 154(b) by 169 days.

(21) Appl. No.: 15/213,579

(22) Filed: Jul. 19, 2016

(65) Prior Publication Data

US 2016/0325797 A1 Nov. 10, 2016

Related U.S. Application Data

(60) Division of application No. 14/299,717, filed on Jun. 9, 2014, now Pat. No. 9,399,492, which is a
(Continued)

(51) Int. Cl.
*B62D 65/02* (2006.01)
*B62D 21/20* (2006.01)
(Continued)

(52) U.S. Cl.
CPC .............. *B62D 65/02* (2013.01); *B23K 31/02* (2013.01); *B62D 21/20* (2013.01); *B62D 25/2054* (2013.01); *B62D 27/023* (2013.01); *B62D 29/008* (2013.01); *B62D 33/02* (2013.01); *B62D 65/00* (2013.01); *B23K 2101/006* (2018.08); *B23K 2103/10* (2018.08); *Y10T 29/49622* (2015.01)

(58) Field of Classification Search
CPC ...... B62D 21/10; B62D 53/061; B62D 65/02; B62D 21/20; B62D 25/2054; B62D 27/023; B62D 29/008; B62D 33/02; B62D 65/00; B23K 31/02; B23K 2101/006; B23K 2103/10; Y10T 29/49622
See application file for complete search history.

(56) References Cited

U.S. PATENT DOCUMENTS 2,753,018 A * 7/1956 Curell ................ B62D 25/2054
105/422
3,411,261 A * 11/1968 Soddy .................... F16B 5/008
29/426.5

(Continued)

*Primary Examiner* — Jacob J Cigna
(74) *Attorney, Agent, or Firm* — Fay Sharpe LLP

(57) ABSTRACT

A platform of a trailer includes spaced-apart left and right side rails and a plurality of extruded aluminum panels that each extend from a left lateral end abutted with said left side rail to a right lateral end abutted with said right side rail. Each of the panels includes an upper wall, a lower wall spaced-apart from the upper wall, and first and second spaced-apart end walls that are connected to and extend between the upper and lower walls. The extruded aluminum panels are abutted in series with the first end wall of one panel abutted with the second end wall of an adjacent abutted panel such that the respective upper walls of adjacent abutted panels of the platform together define an upper, cargo supporting surface of the platform. The platform is arched to correspond with the arch of the first and second beams.

7 Claims, 9 Drawing Sheets

Related U.S. Application Data continuation of application No. 12/850,764, filed on Aug. 5, 2010, now Pat. No. 8,745,871, which is a division of application No. 11/983,047, filed on Nov. 5, 2007, now Pat. No. 7,770,928.

(60) Provisional application No. 60/856,436, filed on Nov. 3, 2006.

(51) Int. Cl.
| | | |
|---|---|---|
| *B62D 25/20* | (2006.01) | |
| *B62D 33/02* | (2006.01) | |
| *B62D 65/00* | (2006.01) | |
| *B23K 31/02* | (2006.01) | |
| *B62D 27/02* | (2006.01) | |
| *B62D 29/00* | (2006.01) | |
| B23K 101/00 | (2006.01) | |
| B23K 103/10 | (2006.01) | |

(56) References Cited

U.S. PATENT DOCUMENTS

| | | |
|---|---|---|
| 3,612,569 A * | 10/1971 | Marinelli .............. B62D 53/061 280/423.1 |
| 3,705,732 A | 12/1972 | Marinelli |
| 3,856,344 A * | 12/1974 | Loeber ............... B62D 25/2054 105/422 |
| 3,909,059 A | 9/1975 | Benninger et al. |
| 3,999,346 A | 12/1976 | Fetherston |
| 4,288,957 A | 9/1981 | Meehan |
| 4,564,233 A | 1/1986 | Booher |
| 4,586,646 A * | 5/1986 | Booher ................ B23K 37/04 228/15.1 |
| 4,758,128 A | 7/1988 | Law |
| 4,787,669 A | 11/1988 | Wante |
| 4,806,065 A | 2/1989 | Holt et al. |
| 4,838,605 A * | 6/1989 | Abromavage ..... B62D 25/2054 105/422 |
| 5,730,485 A | 3/1998 | Sjostedt et al. |
| 5,950,377 A | 9/1999 | Yoder |
| 6,109,684 A | 8/2000 | Reitnouer |
| 6,343,830 B1 | 2/2002 | Ingram et al. |
| 6,474,124 B1 | 11/2002 | Leftwich |
| 6,558,765 B2 | 5/2003 | Padmanabhan |
| 7,152,909 B2 | 12/2006 | Booher |
| 7,181,889 B2 | 2/2007 | Perkowski et al. |
| 7,264,305 B2 | 9/2007 | Kuriakose |
| 7,287,780 B2 | 10/2007 | Reese et al. |
| 7,430,775 B2 * | 10/2008 | Allen .................... B65G 69/30 14/69.5 |
| 7,571,953 B2 | 8/2009 | Adams |
| 7,677,625 B2 | 3/2010 | Gosselin et al. |
| 7,770,928 B2 | 8/2010 | Booher |
| 7,845,700 B2 | 12/2010 | Gosselin et al. |
| 8,936,277 B2 | 1/2015 | Booher et al. |
| 2002/0066184 A1 * | 6/2002 | Crean .................... B62D 21/02 29/897.2 |
| 2003/0011211 A1 * | 1/2003 | Booher ................ B21C 23/145 296/186.1 |
| 2004/0009049 A1 | 1/2004 | Booher |
| 2004/0111814 A1 * | 6/2004 | Allen .................... B65G 69/30 14/69.5 |
| 2005/0248183 A1 * | 11/2005 | Booher ................ B21C 23/145 296/186.1 |
| 2006/0071506 A1 | 4/2006 | Adams |
| 2006/0091640 A1 | 5/2006 | Reese et al. |
| 2007/0007759 A1 * | 1/2007 | Lemmons ............ B62D 21/20 280/789 |
| 2017/0240352 A1 * | 8/2017 | Adams .................. B65D 90/02 |

* cited by examiner

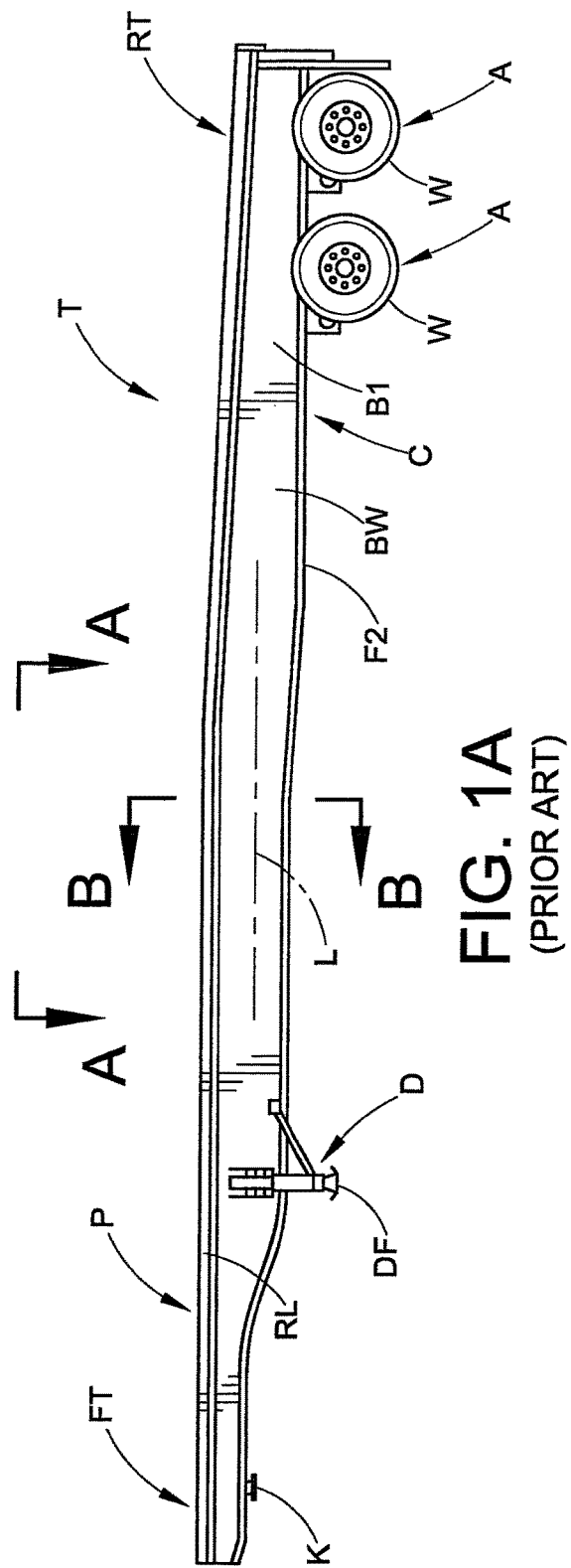
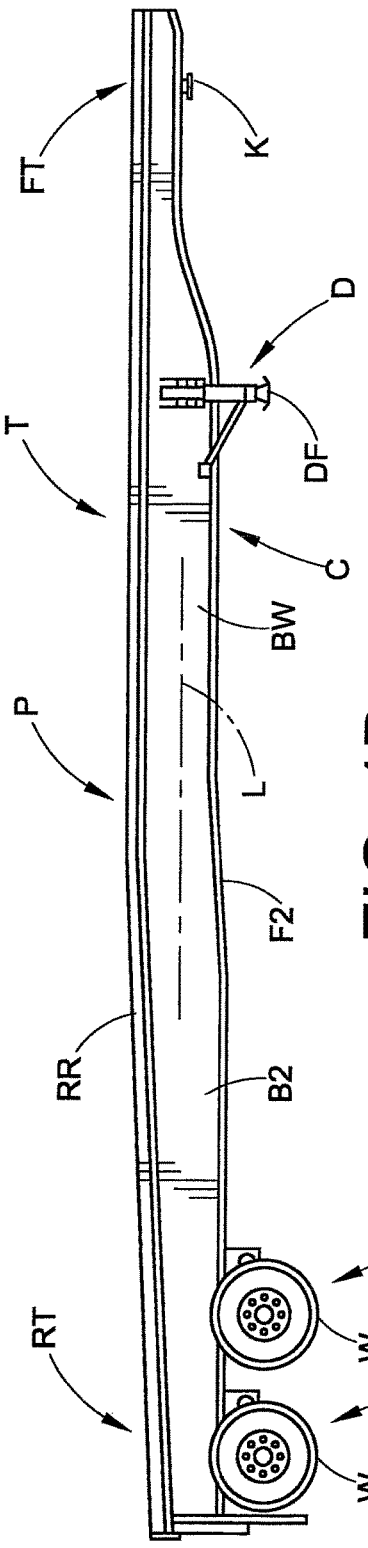
FIG. 1A (PRIOR ART)
FIG. 1B (PRIOR ART)

PLATFORM TRAILER WITH EXTRUDED FLOOR PANEL CROSS MEMBERS

CROSS-REFERENCE TO RELATED APPLICATIONS

This application is a divisional of U.S. application Ser. No. 14/299,717 filed Jun. 9, 2014, now assigned U.S. Pat. No. 9,399,492, which is a continuation of U.S. application Ser. No. 12/850,764 filed Aug. 5, 2010, now assigned U.S. Pat. No. 8,745,871, which is a divisional of U.S. application Ser. No. 11/983,047 filed Nov. 5, 2007, now assigned U.S. Pat. No. 7,770,928, which claims priority from and benefit of the filing date of U.S. provisional application Ser. No. 60/856,436 filed Nov. 3, 2006, and the entire disclosure of each of said prior applications is hereby incorporated by reference into the present specification.

BACKGROUND

FIGS. 1A and 1B are left (driver side) and right (passenger side) elevational views, respectively, of a conventional semi-trailer T adapted to be connected to and pulled by a conventional tractor/truck (not shown). The trailer T comprises a forward end FT and a rear end RT spaced-apart from each other on a longitudinal axis L. FIGS. 2A and 2B are plan and cross section views of the trailer T as taken along view lines A-A and B-B of FIG. 1A, respectively. Referring also to these drawings, it can be seen that the trailer T further comprises a cargo-supporting platform P including left and right laterally spaced-apart sides LP,RP. The platform P is supported by and connected to a chassis C that includes first (left) and second (right) spaced-apart beams B1,B2 that extend parallel to each other and to the longitudinal axis L from the forward end FT to the rear end RT. Each beam B1,B2 defines an I-beam profile comprising an upper flange F1 and a lower flange F2 (FIG. 2B) connected by a web BW. The beams can be steel or aluminum and are often fabricated by welding or otherwise abutting and welding together or otherwise connecting two separate T-shaped aluminum extrusions.

A kingpin K is located at the forward end FT of the trailer T, centrally located between and connected to the beams B1,B2, and is adapted to be engaged by a fifth-wheel of an associated tractor/truck for towing the trailer T. The rear end RT of the trailer includes at least one and typically at least two axle assemblies A connected to the chassis, e.g., to the lower flanges F2 of beams B1,B2. Each axle assembly A comprises at least one left and at least one right rotatable wheel and tire assemblies W for movably supporting the trailer T on a road or other surface. The trailer T further comprises a dolly assembly D, typically located axially between the kingpin K and an axial midpoint of the trailer T. The dolly assembly D includes support feet DF that are selectively lowered to support the forward end FT of the trailer T when the kingpin is not connected to an associated tractor/truck (the dolly assembly D is omitted from the background of FIG. 2B for clarity).

The platform P comprises left and right side rails RL,RR that delimit the opposite lateral sides LP,RP of the platform, respectively. These side rails RL,RR are each typically defined as one-piece or monolithic extrusions of aluminum alloy (often referred to herein simply as "aluminum") having a profile such as that shown in FIG. 2B and that extend in one piece from the forward end FT to the rear end RT of the trailer T, and that lie in respective vertical planes that are parallel to the webs BW of beams B1,B2 and the longitudinal axis L (the profiles of the side rails RL,RR are typically mirror images of each other as shown herein). The side rails RL,RR are often arched as shown in FIGS. 1A and 1B with an apex of the arch oriented upward and located between the forward and rear ends FT,RT.

The platform P, itself, comprises left, middle and right sections PL,PM,PR that each comprise one or more wood and/or metal longitudinally extending platform members PK, each of which extends longitudinally from the forward end FT to the rear end RT of the trailer T, as one-piece or otherwise to define an upper cargo-supporting surface P1. Typically, the platform members PK comprise aluminum extrusions and/or wooden planks or the like. Regardless of the material used to define the platform members PK, it should be noted that they extend longitudinally between the forward and rear trailer ends FT,RT, but do not extend transversely between the left and right side rails RL,RR, i.e., each platform member PK fills only a fraction of the space between the left and right side rails RL,RR. In the illustrated trailer embodiment, the upper flange F1 of each beam B1,B2 also defines part of the platform P, with the upper flange F1 of the first (left) beam B1 connected to both of the left and middle platform sections PL,PM and the upper flange F1 of the second (right) beam B2 connected to both of the right and middle platform sections PR,PM.

In each of the left, middle, and right sections PL,PM,PR, the platform members PK extend in a longitudinal direction that is parallel to the axis L and beams B1,B2, but platform members PK from each section PL,PM,PR do not extend transversely from one section PL,PM,PR to another section PL,PM,PR. If the beams B1,B2 and side rails RL,RR are arched, the platform members PK are correspondingly arched. As such, to support the longitudinally extending platform members PK, the platform P of trailer T must further comprises a plurality of transversely extending cross members CM located beneath the platform members PK at axially spaced intervals along the entire length of the trailer T. The cross members CM are welded or otherwise connected to and extend between the left and right side rails RL,RR, passing through and typically welded to the beams B1,B2 (in some cases the cross members CM comprise three separate sections cross member sections located respectively beneath and supporting the left, middle and right platform sections PL,PM,PR instead of a single member that passes through the beams B1,B2). These cross members CM can have a variety of shapes, e.g., I-beam, U-shaped, C-shaped, etc. and be defined from a variety of materials such as steel or aluminum, e.g., aluminum extrusions. The use of cross members CM increases labor and material costs, and the cross-members create an uneven underside P2 to the platform P which increases wind drag and/or includes locations for dirt, ice and other debris to accumulate between the cross members.

SUMMARY

In accordance with one aspect of the present development, a platform trailer includes a chassis comprising first and second aluminum beams each including an upper flange and a lower flange connected by a web. The first and second beams are arranged parallel to each other and each extend from a forward end to a rear end in the direction of a longitudinal axis of the trailer. The first and second beams are each defined with an arch comprising an upwardly oriented apex located between the forward and rear ends. At least one axle assembly connected to the chassis and includes a left wheel and tire assembly and a right wheel and tire assembly. A platform is supported on the first and second beams of the chassis. The platform includes spaced-apart left and right side rails and a plurality of extruded aluminum panels that each extend from a left lateral end abutted with said left side rail to a right lateral end abutted with said right side rail. Each of the panels comprises an upper wall, a lower wall spaced-apart from the upper wall, and first and second spaced-apart end walls that are connected to and extend between the upper and lower walls. The extruded aluminum panels are abutted in series with the first end wall of one panel abutted with the second end wall of an adjacent abutted panel such that the respective upper walls of adjacent abutted panels of the platform together define an upper, cargo supporting surface of the platform. The platform is arched to correspond with the arch of the first and second beams.

In accordance with another aspect of the present development, a method for constructing a platform trailer includes constructing a platform subassembly comprising plurality of extruded aluminum panels that each extend from a left lateral end to a right lateral end. Each of the panels includes an upper wall, a lower wall spaced-apart from the upper wall, and first and second spaced-apart end walls that are connected to and extend between the upper and lower walls. The extruded aluminum panels are abutted in series with the first end wall of one panel abutted with the second end wall of an adjacent abutted panel such that the respective upper walls of adjacent abutted panels define an upper, cargo supporting surface of the platform subassembly. A force is exerted on the platform subassembly to form an arch in the platform subassembly. While the force is applied to maintain the arch in the platform subassembly, first and second parallel, spaced apart arched beams are welded to the platform subassembly. The force is then removed from the platform subassembly after said first and second arched beams are welded to the platform subassembly.

In accordance with another aspect of the present development, a method for constructing a platform trailer includes constructing a platform subassembly comprising plurality of extruded aluminum panels that each extend from a left lateral end to a right lateral end, each of said panels comprising an upper wall, a lower wall spaced-apart from said upper wall, and first and second spaced-apart end walls that are connected to and extend between the upper and lower walls. The extruded aluminum panels are abutted in series with the first end wall of one panel abutted with the second end wall of an adjacent abutted panel such that the respective upper walls of adjacent abutted panels define an upper, cargo supporting surface of said platform subassembly. The constructing step includes welding the adjacent abutted panels to each other such that said platform subassembly defines a built-in arch. First and second parallel, spaced apart arched beams are then welded to said platform subassembly.

BRIEF DESCRIPTION OF DRAWINGS

FIGS. 1A and 1B are left (driver side) and right (passenger side) elevational views, respectively, of a conventional semi-trailer T adapted to be connected to and pulled by a conventional tractor/truck (not shown).

DETAILED DESCRIPTION

Figure 3A:
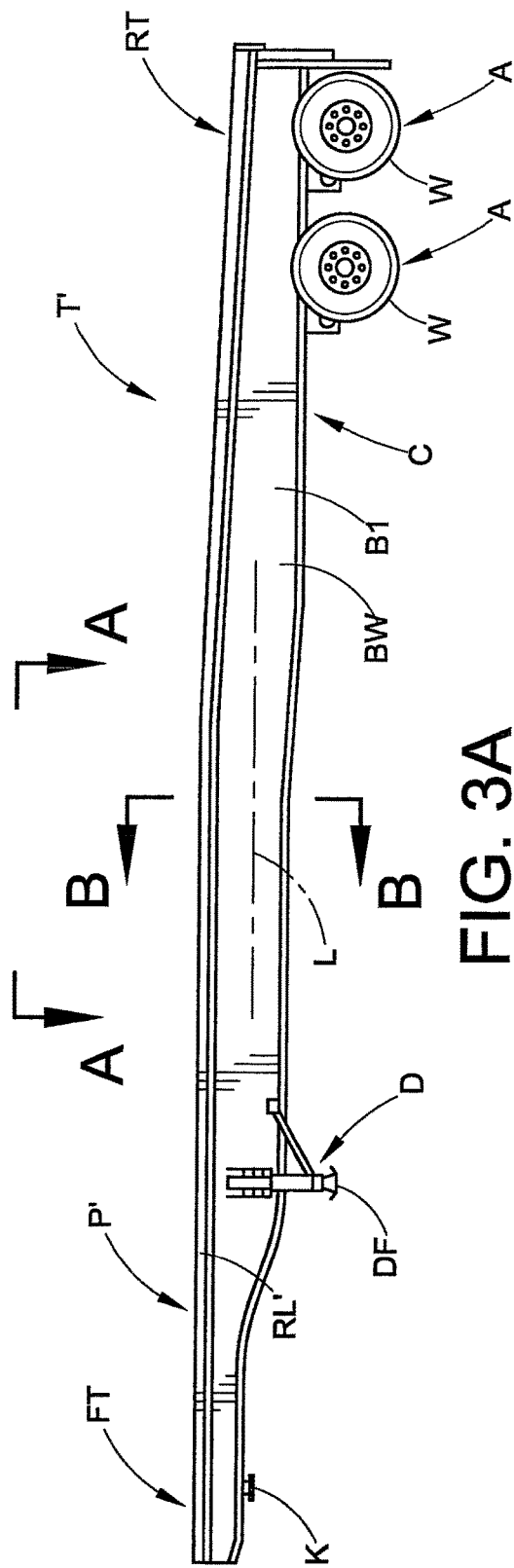
FIGS. 3A and 3B are left (driver side) and right (passenger side) elevational views, respectively, of a semi-trailer T' formed in accordance with the present invention and adapted to be connected to and pulled by a conventional tractor/truck (not shown).
Figure 3B:
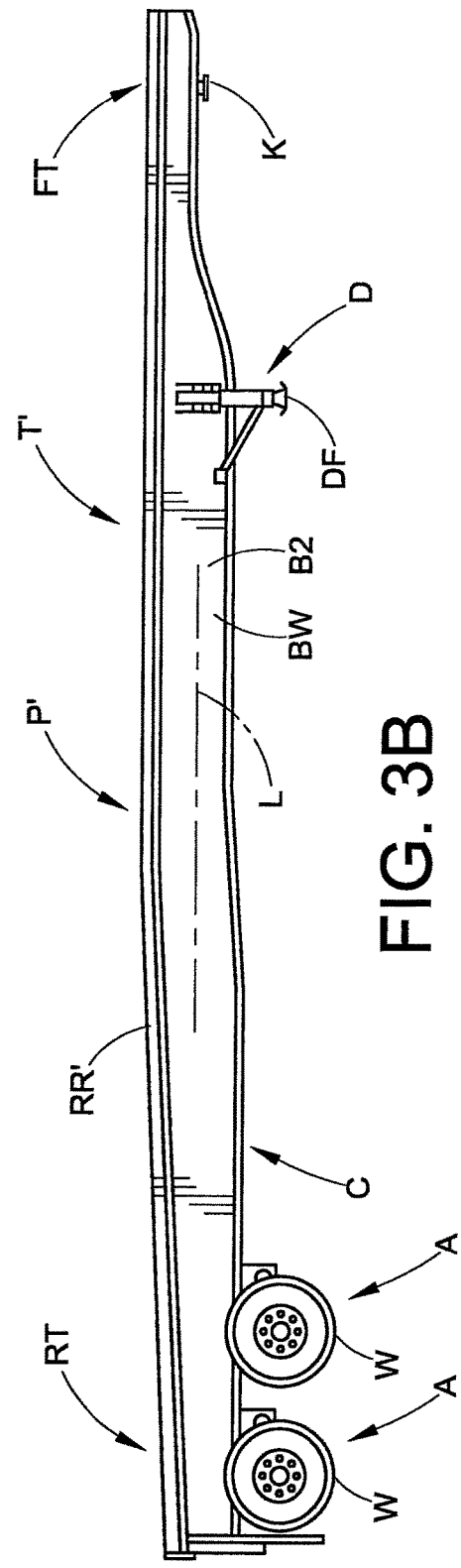

FIGS. 3A and 3B are left (driver side) and right (passenger side) elevational views, respectively, of a semi-trailer T' formed in accordance with the present invention and adapted to be connected to and pulled by a conventional tractor/truck (not shown). Except as otherwise shown and/or described herein, the trailer T' is identical to the prior art trailer T and, as such, like components of the trailer T' relative to the trailer T are identified using the same reference characters used in the description of the trailer T, in some cases without repeating the above descriptions. The trailer T' comprises a forward end FT and a rear end RT spaced-apart from each other on a longitudinal axis L.

Figures 2A, 2B:
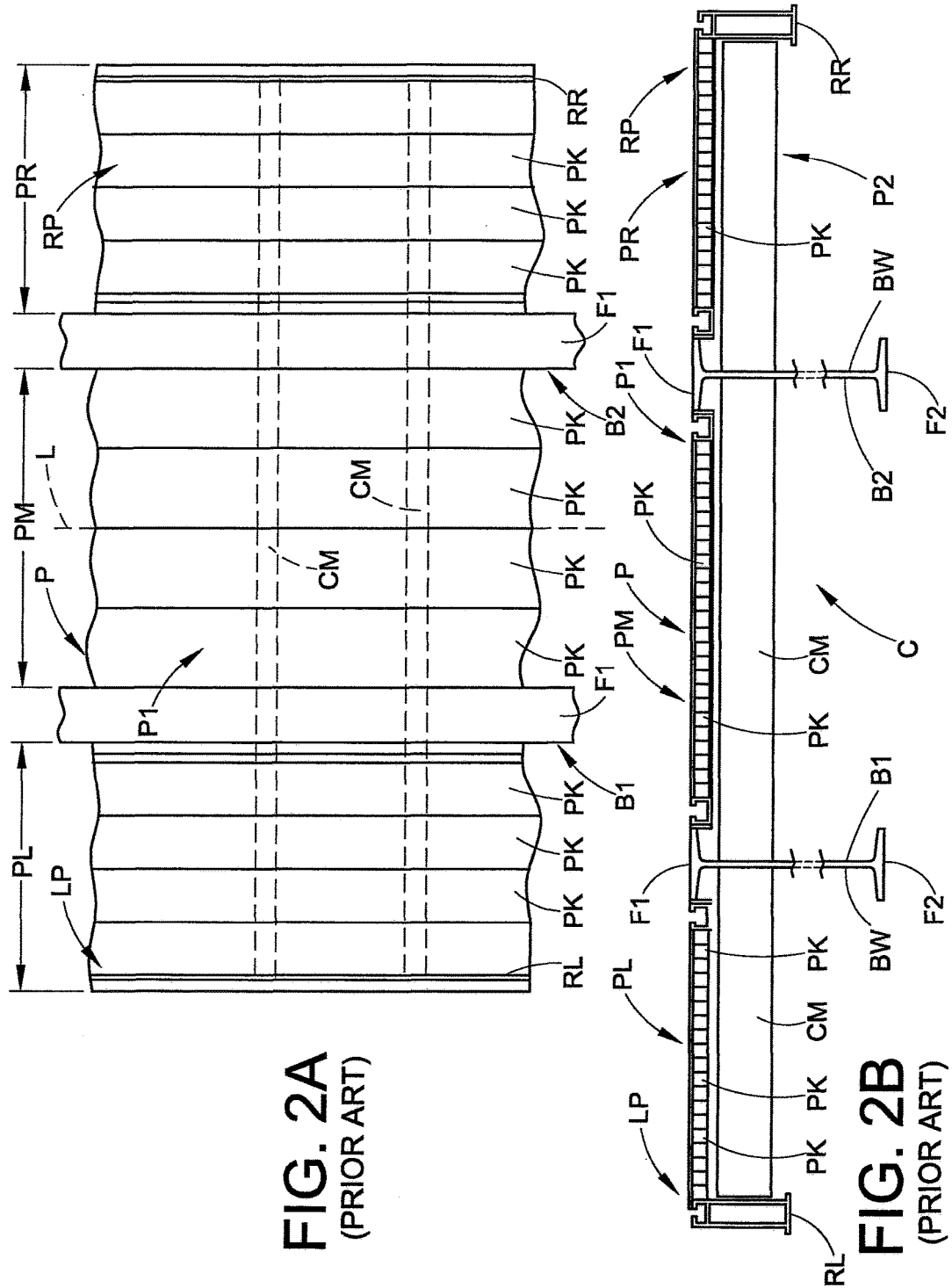
FIGS. 2A and 2B are plan and cross section views of the trailer T as taken along view lines A-A and B-B of FIG. 1A, respectively.
Figure 4A:
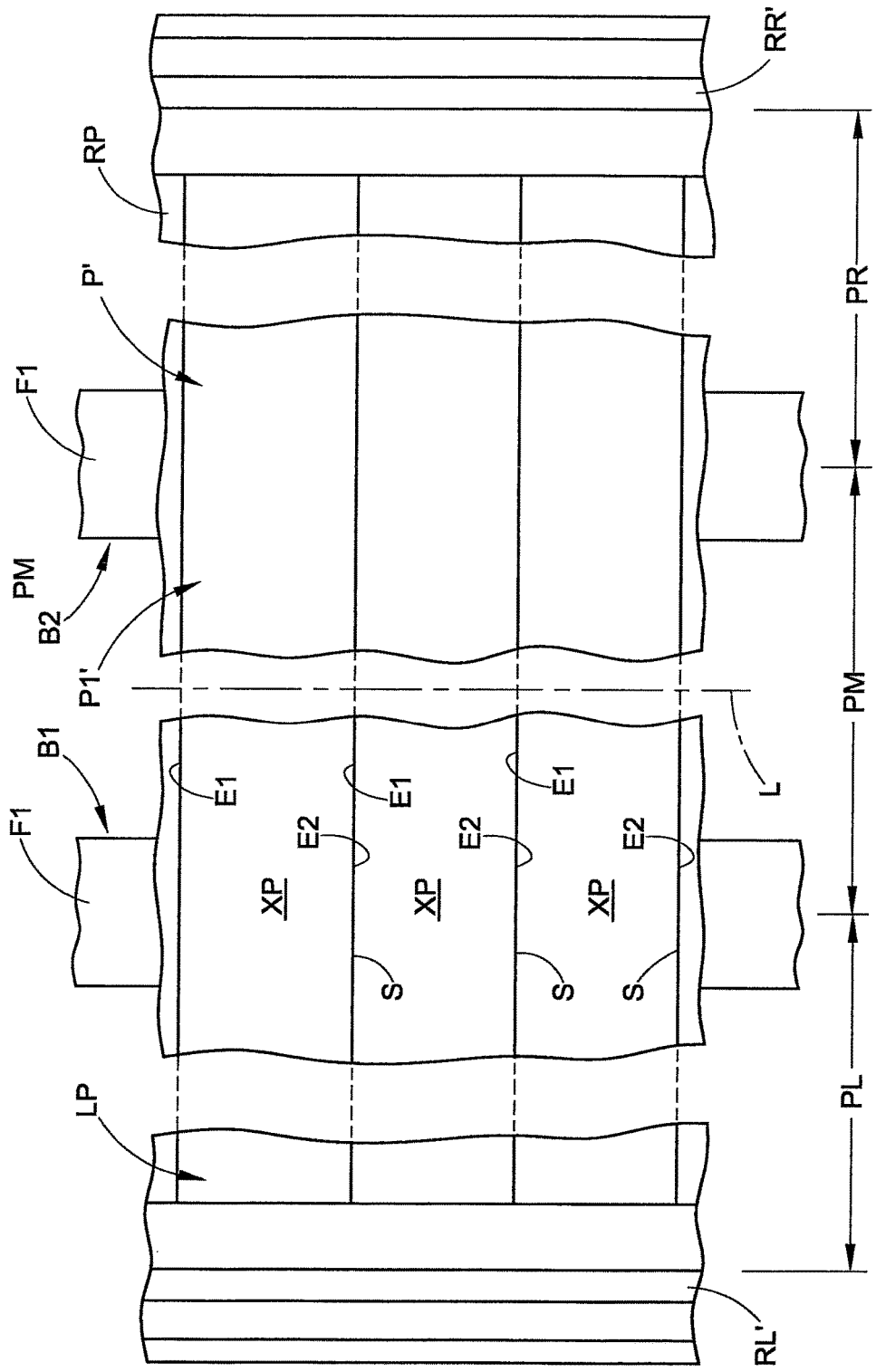
FIGS. 4A and 4B are plan and cross section views of the trailer T' as taken along view lines A-A and B-B of FIG. 3A, respectively.
Figure 4B:
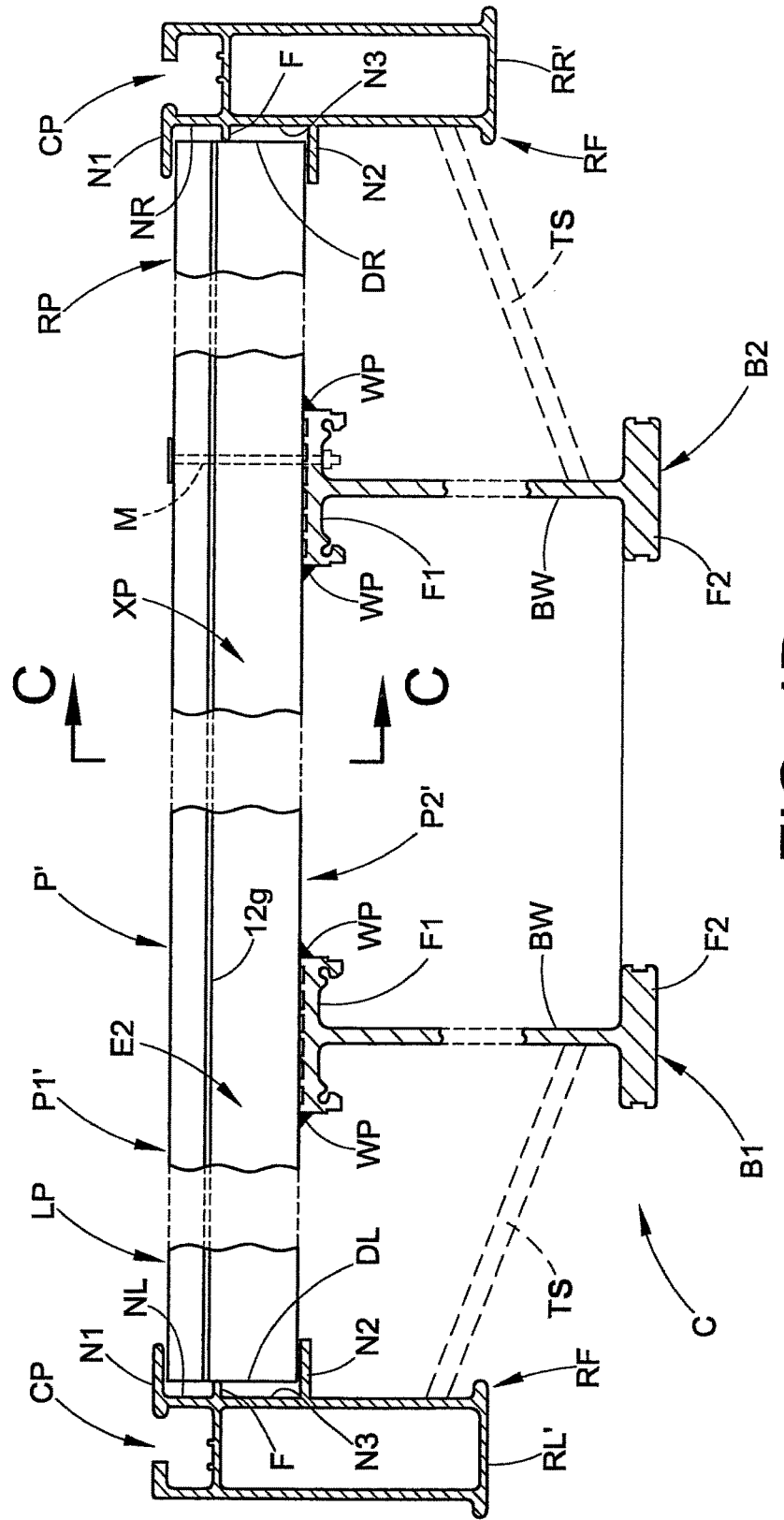

FIGS. 4A and 4B are plan and cross section views of the trailer T' as taken along view lines A-A and B-B of FIG. 3A, respectively. Referring also to these drawings, the trailer T' further comprises a cargo-supporting platform P' including left and right laterally spaced-apart sides LP,RP. The platform P' is supported by and connected to a chassis C including first (left) and second (right) spaced-apart beams B1,B2 that extend parallel to each other and to the longitudinal axis L from the forward end FT to the rear end RT. Each beam B1,B2 defines an I-beam profile comprising an upper flange F1 and a lower flange F2 (FIG. 2B) connected by a web BW. The beams are defined from aluminum alloy (sometimes referred to herein simply as "aluminum") extrusions, e.g., fabricated from first and second T-shaped extrusions that are arranged with their bases abutted and welded or otherwise connected together so as to define the illustrated I-beam profile. The upper flanges F1 can extend horizontal or flat (i.e., in a horizontal plane) between the forward and rear trailer ends FT,RT or, as shown in FIGS. 3A and 3B, are preferably arched between the forward and rear trailer ends FT,RT, so that at least the upper flange F1 of each beam B1,B2 follows a convex arch with the apex of the arch oriented upward toward the platform P' between the forward and rear trailer ends FT,RT.

A kingpin K is located at the forward end FT of the trailer T', centrally located between and connected to the beams B1,B2, and is adapted to be engaged by a fifth-wheel of an associated tractor/truck for towing the trailer T'. The rear end RT of the trailer includes at least one and typically at least two axle assemblies A connected to the chassis C, e.g., to the lower flanges F2 of beams B1,B2. Each axle assembly A comprises at least one left and at least one right rotatable wheel and tire assembly W for movably supporting the trailer T' on a road or other surface. The trailer T' further comprises a dolly assembly D, typically located axially between the kingpin K and an axial midpoint of the trailer T'. The dolly assembly D includes support feet DF that are selectively lowered to support the forward end FT of the trailer T' when the kingpin K is not connected to an associated tractor/truck (the dolly assembly D is omitted from the background of FIG. 4B for clarity).

The platform P' comprises left and right side rails RL',RR' that delimit the opposite lateral sides LP,RP of the platform, respectively. These side rails RL',RR' are each typically defined as one-piece or monolithic extrusions of aluminum having a profile such as that shown in FIG. 4B and that extend in one piece from the forward end FT to the rear end RT of the trailer T. The side rails RL',RR' lie in respective vertical planes that are parallel to the webs BW of beams B1,B2 and parallel to the longitudinal axis L (the profiles of the side rails RL',RR' are typically mirror images of each other as shown herein). If the beam flanges F1 are arched, the side rails RL',RR' are correspondingly arched. The side rails RL',RR' include lower flanges RF for slidably mounting a winch or clip for securing a cargo-retaining strap, and include mounting slots CP for securing chain plates.

The platform P' is further defined by a plurality of one-piece extruded hollow cross member floor panels XP each arranged transverse, preferably perpendicular, relative to the longitudinal axis L. Each panel XP is connected to and extends in an uninterrupted fashion from the left side rail RL' to the right side rail RR' and preferably meets the rails RL',RR' at a right angle. As shown in FIG. 4A, the platform P' comprises: (i) a left section PL defined between the left side rail RL' and the lateral center of the beam B1; (ii) a middle section PM defined between the lateral centers of beams B1,B2; and, (iii) and a right section PR defined between the lateral center of beam B2 and the right side rail RR'. Because each extruded panel XP extends to and entirely between the left and right side rails RL',RR' in one-piece, the left, middle and right platform sections PL,PM,PR are each partially defined by every extruded panel XP of the platform P'.

Figure 4C:
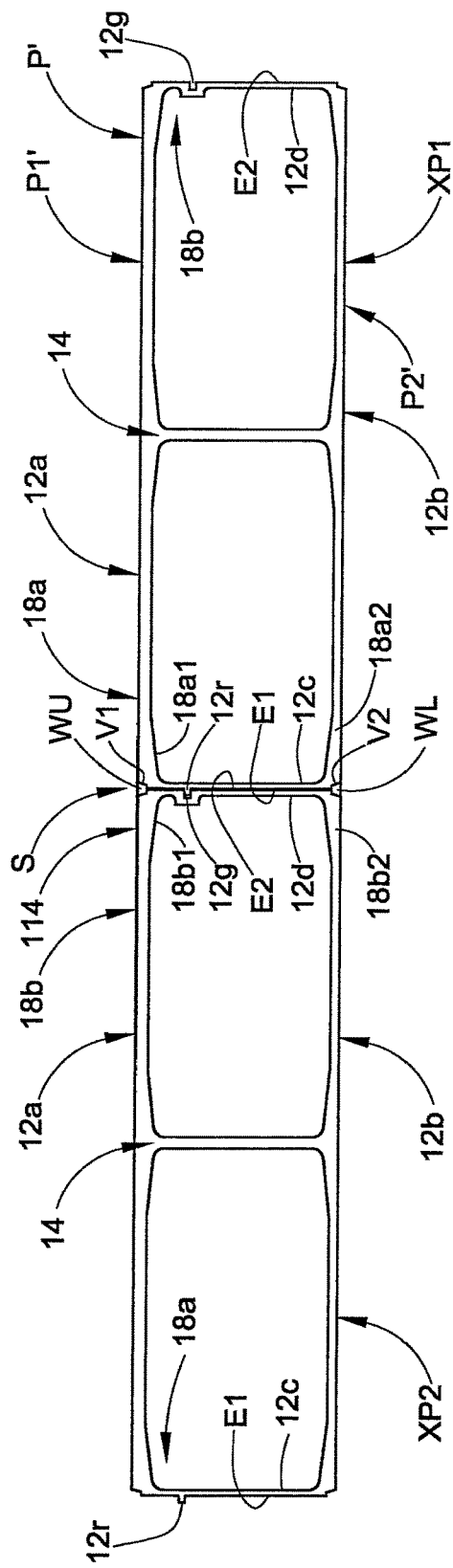
FIG. 4C is a sectional view of the platform P' as taken at line C-C of FIG. 4B, and shows first and second extruded floor panels XP (i.e., first panel XP1 and second panel XP2) of the platform P'.

As shown in FIG. 4A, each panel XP includes first (front) and second (rear) edges or sides E1,E2, and longitudinally adjacent panels XP are abutted with the first edge of a panel XP abutted with the second edge E2 of the adjacent panel, so that laterally extending seams S are defined and extend to and between the left and right side rails RL',RR'. As such, due to the shape of the panels XP as described in further detail below, the platform P' comprises and upper or top (cargo-supporting) surface P1' that is smooth and uninterrupted except for the seams S, and also comprises a lower or bottom surface P2' that is likewise smooth and uninterrupted except for the seams S so as to reduce wind drag and to prevent undesired accumulation of ice, mud or other debris. The adjacent abutted panels XP are preferably fixedly secured to each other at the seams S by welding, adhesive, snap-fit, friction fit, or otherwise. If welded, it is preferred that the weld(s) extend along the seam S uninterrupted at least from the left side rail RL' to the right side rail RR'. Most preferably each weld extends uninterrupted from and between the left and right lateral ends DL,DR (FIG. 4B) of each panel XP so that at least part of the weld of the seam S is received into the floor receiving channels NL,NR of the left and right side rails RL',RR'. As shown in FIG. 4C, each seam S can be welded with an upper weld WU located adjacent the platform upper surface P1' and/or with a lower weld WL located adjacent the platform lower surface P2'. Preferably, the panels XP are interconnected so as to define the platform P' to have an arch to conform with an arch defined by the upper flanges F1 of beams B1,B2.

FIG. 4C is a sectional view of the platform P' as taken at line C-C of FIG. 4B, and shows first and second extruded floor panels XP (i.e., first panel XP1 and second panel XP2) of the platform P'. The smooth and uninterrupted upper and lower platform surfaces P1',P2' are readily apparent in FIG. 4C, as is the seam S defined where the panels XP1,XP2 are abutted at their respective edges E1,E2.

Figure 5:
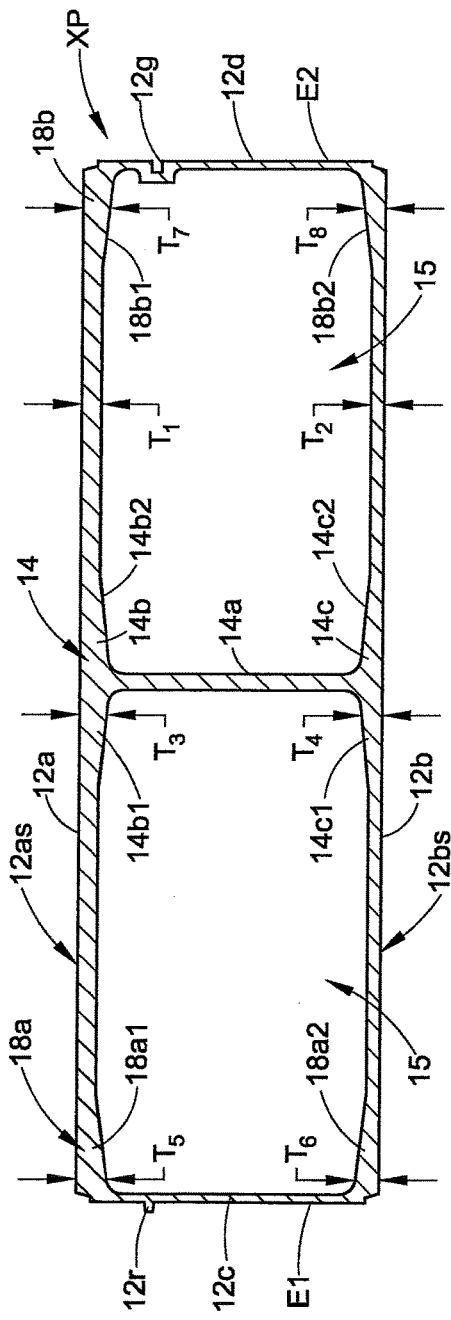
FIG. 5 illustrates the extrusion profile of an individual panel XP formed in accordance with the present invention.

With reference also to FIG. 5, the profile of an individual panel XP formed in accordance with the present invention is shown. The panel XP is preferably defined as a monolithic member, most preferably as an extrusion of aluminum, i.e., an aluminum alloy such as 6061-T6 aluminum alloy or another suitable aluminum alloy, having the illustrated profile. The panel XP comprises an upper wall $12a$ with a smooth planar or other flat outer surface $12as$ oriented upward to define, together with the other panels XP of platform P', the cargo-supporting upper surface P1' of the platform P'. The panel XP further comprises a lower wall $12b$ with a smooth planar or other flat outer surface $12bs$ oriented downward to define, together with the other panels XP, the lower surface P2' of the platform P'. As used herein, a "flat surface" is intended encompass a perfectly smooth, planar surface and also a flat surface having a surface texture defined therein by ribs, grooves or the like that do not change the overall orientation or direction of the surface, e.g., grooves having a depth less than or ribs having a height less than the thickness of the walls $12a,12b$. The upper and lower outer surfaces $12as,12bs$ lie in respective horizontal planes and are arranged in parallel spaced-apart relation to each other. The upper and lower walls $12a,12b$ can have the same minimum thickness but, because the upper wall $12a$ is in contact with the cargo while the lower wall $12b$ is not, it is preferred that the upper wall $12a$ have a minimum thickness $T_1$ that is greater than the minimum thickness $T_2$ of lower wall $12b$ to reduce weight and material cost while providing the required strength where needed.

With reference again to FIGS. 4C and 5, in an alternative embodiment, the extruded panel XP1 has a larger minimum wall thicknesses $T_1$ for its upper wall $12a$ as compared to the panel XP2, so that the platform section constructed with the thicker panels XP1 has a stronger upper surface P1'. This alternative structure allows for selective sections of the trailer platform P' to be constructed with the stronger panels XP1 (e.g., a steel coil cargo carrying region or a rear region where a lift truck moves onto and off of the platform P') for added strength and allows other lower-stress sections of the trailer platform P' to be constructed with the lighter-weight panels XP2.

The upper and lower walls $12a,12b$ are joined by opposite first and second end walls $12c,12d$ which, in the illustrated embodiment, are arranged in parallel spaced-apart relation to each other in respective vertical planes. The end walls $12c,12d$ comprise respective mating conformations such as the illustrated male rib $12r$ and female groove $12g$. As shown in FIG. 4C, the rib $12r$ and groove $12g$ are sized for close sliding receipt of the rib $12r$ of a first panel XP1 into the groove $12g$ of a second panel XP2 abutted with the first panel so that a plurality of the panels XP define the platform P'. This mechanical connection of the panels XP1,XP2 increases strength and facilitates a subsequent bonding operation by suitable means such as the preferred welding operation or, alternatively, adhesive and/or fasteners for permanently securing the panels to each other to define the platform P'. More particularly, as is also apparent in FIG. 4C, the panels XP1,XP2 are defined so that when they are abutted to define a platform P', the abutted panels cooperate to define first and second welding grooves V1,V2 adapted to receive the welds WU,WL, i.e., each panel XP1,XP2 defines half of each groove V1,V2. Alternatively, the grooves V1,V2 can receive an adhesive used to permanently affix the panels XP1,XP2 to each other.

Referring again specifically to FIG. 5, each panel XP defines at least one support wall in its profile, such as the illustrated primary I-beam cross-member 14. The one or more primary I-beam cross-members 14 are preferably equally spaced or distributed between the end walls 12c,12d. The primary I-beam cross-member 14 (only one illustrated in FIG. 5) comprises a support web 14a that spans the space between walls 12a,12b and first and second flanges 14b,14c arranged transversely relative to the support web 14a. Preferably the web 14a lies in a vertical plane and the flanges 14b,14c are perpendicularly connected to the web 14a. The flanges 14b and 14c have respective symmetrical first and second halves 14b1,14b2 and 14c1,14c2. The flange halves 14b1,14b2 each define a thickness $T_3$ and the flange halves 14c1,14c2 each define a thickness $T_4$.

In the illustrated embodiment, the thicknesses $T_3,T_4$ of the flanges are maximized and are greater than the respective wall thicknesses T1,T2 adjacent support web 14a, and taper as the distance from the support web 14a increases, until the thickness $T_3,T_4$ is equal the minimum thicknesses $T_1,T_2$ of walls 12a,12b, respectively. For added strength, the maximum thickness $T_3$ of flange 14b is preferably greater than the maximum thickness $T_4$ for flange 14c to provide added strength to upper (cargo carrying) wall 12a and to reduce weight/material for lower wall 12b. Each panel XP thus defines at least two horizontally-extending hollow cores 15 separated from each other by a primary I-beam cross-member 14. Although the I-beam cross-member 14 is shown with tapered flanges 14b,14c, the flanges 14b,14c can alternatively have respectively constant thicknesses, e.g., the wall thicknesses T1,T2, respectively.

In addition to the primary I-beam cross-member(s) 14, each panel XP further defines first and second partial or half I-beam cross-members 18a,18b that are preferably mirror-images of each other. More particularly, the first half I-beam cross-member 18a comprises a web defined by the end wall 12c, and first and second half-flanges 18a1,18a2 that are connected to and project transversely from the end wall 12c. The half-flanges 18a1,18a2 have respective thicknesses $T_5,T_6$ that are preferably but not necessarily maximized and greater than the respective wall thicknesses $T_1,T_2$ adjacent end wall 12c and that taper as the distance from end wall 12c increases until the thicknesses are equal to the minimum wall thickness $T_1,T_2$, respectively.

Similarly, the second half I-beam cross-member 18b comprises a web defined by the end wall 12d, and first and second half-flanges 18b1,18b2 that are connected to and project transversely from the end wall 12d. The half-flanges 18b1,18b2 have respective thicknesses $T_7,T_8$ that are preferably but not necessarily maximized and greater than the respective wall thicknesses $T_7,T_8$ adjacent end wall 12d and that taper as the distance from end wall 12d increases until the thickness are equal to the minimum wall thicknesses $T_1,T_2$, respectively.

Referring again to FIG. 4C, those of ordinary skill in the art will recognize that when the first and second floor panels XP1,XP2 are abutted, with the rib 12r seated in groove 12g and walls 12c,12d in contact or very closely adjacent, and when the grooves V1,V2 are filled with a welding bead or adhesive, the first half I-beam cross-member 18a of the first panel XP1 and second half I-beam cross-member 18b of the second panel XP2 together define a full secondary I-beam cross-member 114 that has a structure that is at least substantially identical to the one or more primary I-beam cross-members 14. As such, platform P' defined from a plurality of interconnected panels XP will comprise at least one primary I-beam cross-member 14 defined as part of each panel XP, and another secondary I-beam cross-member 114 defined at the seam S between each pair of abutted panels XP. As such, the platform P' includes integral cross-members comprising the primary I-beam cross-member 14 of each panel XP and the secondary I-beam cross-members 114 defined by each pair of abutted interconnected panels XP. Accordingly, the platform P' need not comprise separate transverse cross-members such as the cross-members CM described above in relation to the trailer T. Instead, as shown in FIG. 4B, the platform P' is self-supporting on the beams B1,B2 so that the lower surface P2' of the platform P' is more aerodynamically efficient owing to the absence of external cross-members.

Figure 6:
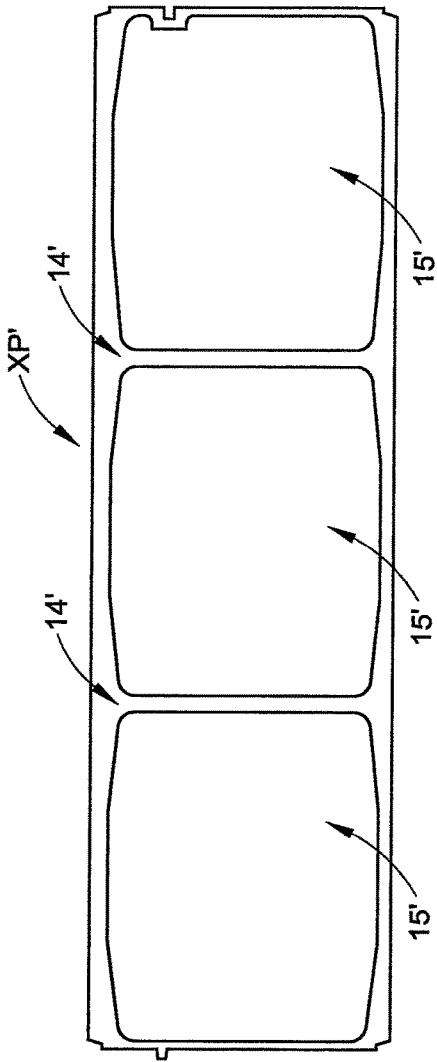
FIG. 6 illustrates the extrusion profile of an alternative floor panel XP' that is identical to the panel XP except as otherwise shown and/or described.

FIG. 6 illustrates an alternative floor panel XP' that is identical to the panel XP except as otherwise shown and/or described. The floor panel XP' can be used in place of all or some of the floor panels XP used to define the platform P'. For example, the panels XP' are used where a higher-strength platform P' or section thereof is required, e.g., a steel-coil cargo carrying section or a region expected to receive repetitive lift truck travel or other extreme forces. The panel XP' comprises in its extrusion profile as shown including at least two integral I-beam cross-members 14' instead of a single I-beam cross-member. As such, at least three hollow core regions 15' are defined, but each hollow core region 15' has a width that is smaller than a corresponding width of the hollow regions 15 of floor panel XP to increase the strength of the panel XP' relative to the panel XP. Of course, the panel XP' can include four or more voids 15' if additional cross-members 14' are included for even more strength.

Referring again to FIG. 4B, the left and right side rails RL',RR', comprise respective inwardly directed floor receiving channels NL,NR that receive and retain the opposite left and right ends DL,DR of each panel XP between upper and lower horizontal channel walls N1,N2. The floor-receiving channels NL,NR also include an inner vertical channel wall N3 that extends between and interconnects the upper and lower horizontal channel walls N1,N2 so that the floor-receiving channels are C-shaped in cross-section in the illustrated embodiment. As part of the extrusion profile or otherwise, the left and right side rails RL',RR' each comprise a stand-off nib F that prevents the panel edges DL,DR from contacting the inner channel wall N3. As such, any water that enters the core 15,15' of a panel XP,XP' through a puncture can flow laterally outward into the floor-receiving channels NL,NR for drainage from the trailer T'. Preferably, the upper and/or lower channel walls N1,N2 are welded or otherwise fixedly secured to the upper and lower platform surfaces P1',P2' for added strength and so that the side rails RL',RR' can be used as anchor locations for cargo hold-down systems.

The platform P' is connected to the beams B1,B2 by any suitable means. As shown, welds WP are used to secure the underside P2' of platform P' to the upper flanges F1 of the beams B1,B2. For each beam B1,B2, first and second welds WP are located at first and second (left and right) interfaces of the beam upper flange F1 with the lower surface P2' of the platform P'. Each weld WP preferably extends continuously and uninterrupted along the interface between the beam B1,B2 and the platform underside P2' for the axial length of each beam. Additionally or alternatively, fasteners M such as bolts, U-bolts or the like are passed completely or partially through the platform P' and secured to the upper flanges F1 of the beams B1,B2 as shown in broken lines. Also, struts or braces or "outriggers" TS can optionally be used to connect the left side rail RL' (or the underside P2' of the left platform section PL) to the beam B1 and to connect the right side rail RR' (or the underside P2' of the right platform section PR) to the beam B2, which further fixedly secures the platform P' to the beams B1,B2. In such case, the struts TS are welded in position and/or are connected using fasteners.

Figure 7:
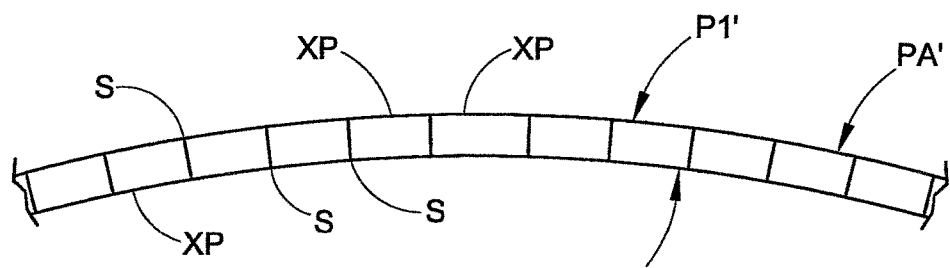
FIG. 7 illustrates one method of manufacturing a trailer platform including an arch according to the present development.

The platform P' is preferably arched to conform with an arch of at least the upper flanges F1 of the beams B1,B2 as shown in FIGS. 3A and 3B. Various structures and methods can be used to provide a platform P' that is arched to conform to the arch of the beams B1,B2. In one embodiment, it is contemplated that the platform P' comprise separate sections of floor panels XP, wherein each section comprises a single panel XP or two or more interconnected panels XP as shown in FIG. 4C, but wherein the separate floor sections or one or multiple interconnected panels are, not connected to each other to allow the platform P' to have a non-planar, e.g., arched, configuration that follows the arch of the beams B1,B2. In another embodiment as shown in FIG. 7, the panels XP (shown only diagrammatically) are welded together at the seams to define a platform subassembly PA' with a built-in arch that corresponds to the arch of the beam B1,B2. The side rails RL',RR' are then fitted and welded to the platform subassembly PA' to define a platform P', and the platform P' is then fitted to the upper flanges F1 of the beams B1,B2 and welded or otherwise secured to the beams as described above.

Figure 8A:
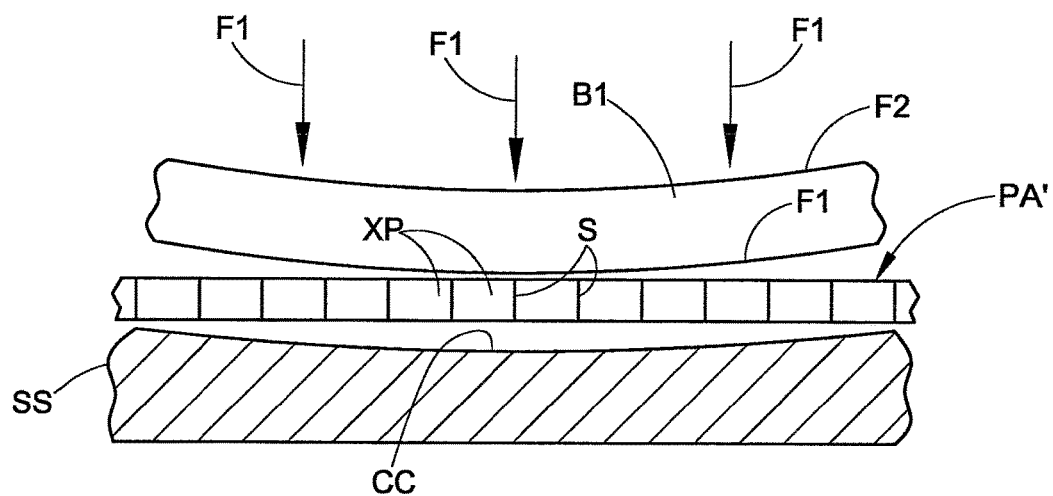
FIGS. 8A and 8B illustrate another method of manufacturing a trailer platform including an arch according to the present development.
Figure 8B:
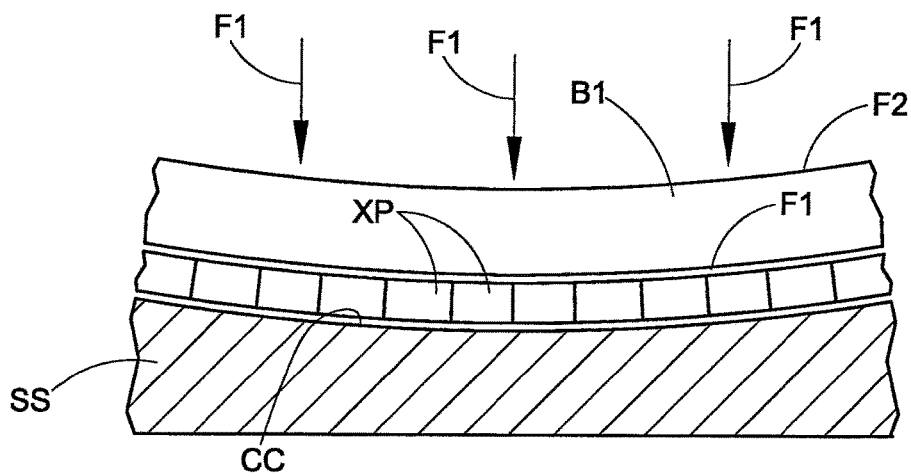

Referring to FIGS. 8A and 8B, another embodiment is diagrammatically illustrated. In such embodiment, a platform subassembly PA" (which is preferably the entire length of the platform P', but can be only part of the platform length) is constructed by welding together a plurality of panels XP at the seams S as shown in FIG. 4C. The platform subassembly PA" is flat or otherwise shaped without an arched configuration that corresponds to the arch of the beams B1,B2. The platform subassembly PA" is preferably inverted and supported on a support surface SS which can be flat or, as shown, can include a concave form CC shaped to correspond with the desired arched shape for the finishes platform P'. The beams B1,B2 (only beams B1 is visible) are inverted and then engaged with the platform subassembly PA" and are used to urge the platform subassembly PA" against the support surface SS with a force F1 so that the platform subassembly PA" deforms and conforms to the arched configuration of the upper flanges F1 of the beams B1,B2 (the force F1 is preferably applied to both beams B1,B2 simultaneously). It is most preferred that the beams B1,B2 be welded to the platform subassembly PA" along the full axial length of the upper flanges F1 of both beams B1,B2 via welds WP at the interface of the beam upper flanges F1 with the platform subassembly PA" while the force F1 is continuously applied, to provide a prestressed welded structure including the beams B1,B2 and the platform subassembly PA". The platform subassembly PA" is preferably provided as a complete platform P', i.e., the platform subassembly includes the side rails RL',RR', or the side rails RL',RR' can be applied after the platform subassembly PA" is connected to both beams B1,B2. The resulting prestressed, welded structural unit including the beams B1,B2 and platform P' is resistant to sagging when loaded which provides a structural and an aesthetic benefit. The arch of the platform P' is defined herein as having a longitudinal axis that is perpendicular to the longitudinal axis L of the trailer T', such that each panel XP extends parallel to the longitudinal axis of the arch.

Figure 9:
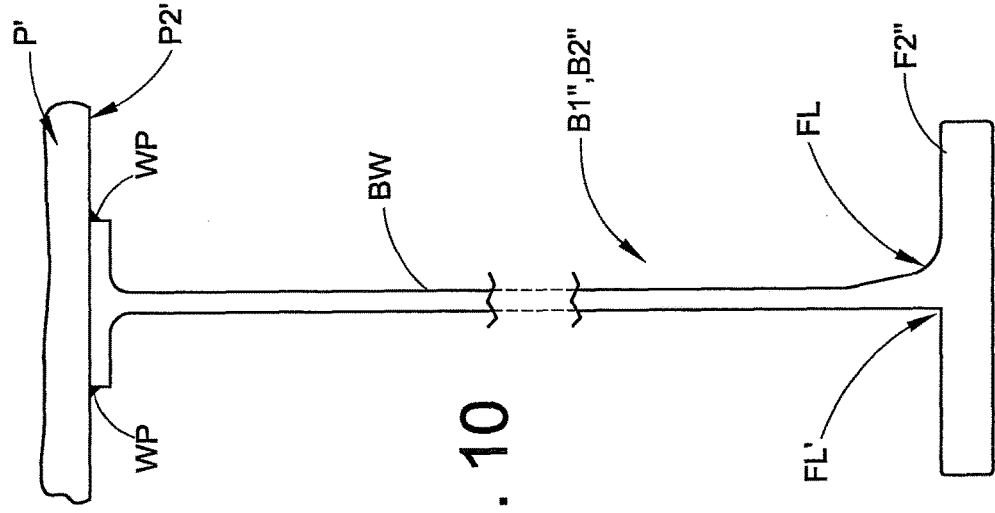
FIGS. 9 and 10 illustrate alternative profiles for the beams B1,B2.
Figure 10:
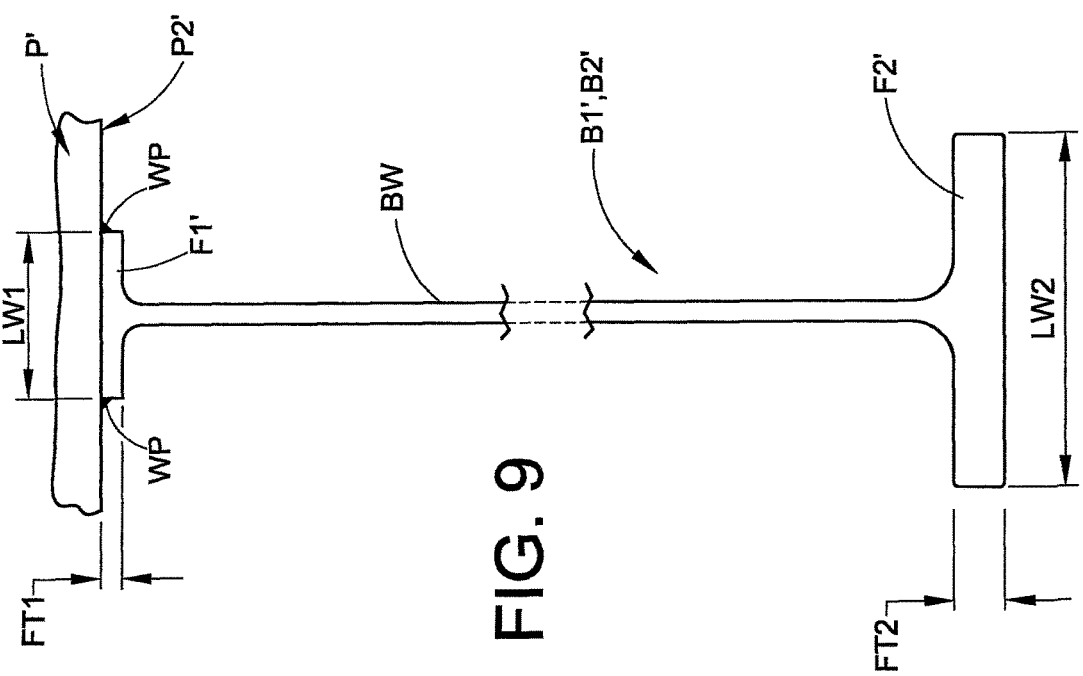

FIGS. 9 and 10 illustrate alternative profiles for the beams B1,B2. FIG. 9 shows a first alternative beam profile B1',B2' in which the upper and lower flanges F1',F2' are shaped differently from each other, with the upper flange F1' defining a lateral width LW1 and a thickness FT1 smaller than a corresponding lateral width LW2 and thickness FT2 of the lower flange F2'. The beam B1",B2" of FIG. 10 is similar, but the lower flange F2" is asymmetric in the sense that a fillet FL is defined between the web BW and flange F2" on a first lateral side of the web, while the opposite lateral side of the web BW joins the flange F2" with a non-filleted connection FL'. This structure is believed to provide superior strength and durability by eliminating stress concentrations.

The present invention has been described with reference to preferred embodiments. It is not intended that the invention be limited to the preferred embodiments, and this specification is intended to be construed literally and/or according to the doctrine or equivalents to encompass modifications and alterations to the fullest possible extent.

The invention claimed is:

1. A method for constructing a platform trailer, said method comprising:
   constructing a platform subassembly comprising plurality of extruded aluminum panels that each extend from a left lateral end to a right lateral end, each of said panels comprising an upper wall, a lower wall spaced-apart from said upper wall, and first and second spaced-apart end walls that are connected to and extend between the upper and lower walls, wherein said extruded aluminum panels are abutted in series with the first end wall of one panel abutted with the second end wall of an adjacent abutted panel such that the respective upper walls of adjacent abutted panels define a cargo supporting surface of said platform subassembly and such that the respective lower walls of the adjacent abutted panels define a lower surface of said platform subassembly;
   deforming said platform subassembly from a flat configuration to an arched configuration by application of force;
   abutting the platform subassembly while in said arched configuration with first and second spaced-apart arched aluminum beams that extend parallel to a longitudinal axis;
   welding said platform subassembly to said first and second parallel, spaced-apart arched aluminum beams with said panels of said platform subassembly extending transversely relative to said longitudinal axis, wherein said step of welding said platform subassembly to said first and second aluminum beams comprises holding said platform subassembly in said arched configuration while said platform subassembly is in contact with said first and said aluminum beams during said welding step;
   connecting an axle assembly to the first and second aluminum beams, said axle assembly comprising a left wheel and tire assembly and a right wheel and tire assembly.

2. The method of constructing a platform trailer as set forth in claim 1, wherein said welding step comprises welding the upper flange each of said first and second beams to said lower surface of said platform subassembly using left and right welds that each extend axially an interface defined between the respective upper flange and the lower surface of the platform subassembly.

3. The method of constructing a platform trailer as set forth in claim 2, wherein the upper, cargo supporting surface of said platform subassembly is oriented downward when said platform subassembly is welded to said first and second aluminum beams.

4. A method for constructing a platform trailer, said method comprising:

constructing a platform subassembly comprising plurality of extruded aluminum panels that each extend from a left lateral end to a right lateral end, each of said panels comprising an upper wall, a lower wall spaced-apart from said upper wall, and first and second spaced-apart end walls that are connected to and extend between the upper and lower walls, wherein said extruded aluminum panels are abutted in series such that the respective upper walls of adjacent abutted panels define a cargo supporting surface of said platform subassembly and such that the respective lower walls of the adjacent abutted panels define a lower surface of said platform subassembly;

deforming said platform subassembly from a flat configuration to an arched configuration by application of force while said lower surface of said platform subassembly in in contact with first and second spaced-apart arched aluminum beams such that said platform subassembly conforms to said first and second spaced-apart arched aluminum beams;

welding said platform subassembly to first and second parallel, spaced-apart arched aluminum beams with said first and second beams extending parallel to a longitudinal axis and with said panels of said platform subassembly extending transversely relative to said longitudinal axis, and wherein said step of welding said platform subassembly to said first and second aluminum beams comprises holding said platform subassembly in said arched configuration while said lower surface of said platform subassembly is in contact with said first and said aluminum beams during said welding step;

connecting an axle assembly to the first and second aluminum beams, said axle assembly comprising a left wheel and tire assembly and a right wheel and tire assembly.

5. The method as set forth in claim 4, wherein said extruded aluminum panels are abutted in series in a manner such that the first end wall of one panel is abutted with the second end wall of an adjacent abutted panel and such that a rib projecting from the first end wall is received in a groove defined in the second end wall.

6. The method of constructing a platform trailer as set forth in claim 4, wherein said welding step comprises welding the upper flange each of said first and second beams to said lower surface of said platform subassembly using left and right welds that each extend axially an interface defined between the respective upper flange and the lower surface of the platform subassembly.

7. The method of constructing a platform trailer as set forth in claim 6, wherein the upper, cargo supporting surface of said platform subassembly is oriented downward when said platform subassembly is welded to said first and second aluminum beams.

* * * * *